US012212144B2

(12) United States Patent
Kuznetsov

(10) Patent No.: US 12,212,144 B2
(45) Date of Patent: Jan. 28, 2025

(54) MULTI-PORT SUBSEA HIGH-VOLTAGE POWER MODULATION AND STORED ENERGY DISTRIBUTION SYSTEM

(71) Applicant: Raytheon Company, Waltham, MA (US)

(72) Inventor: Stephen B. Kuznetsov, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 103 days.

(21) Appl. No.: 18/303,418

(22) Filed: Apr. 19, 2023

(65) Prior Publication Data

US 2024/0356336 A1    Oct. 24, 2024

(51) Int. Cl.
*H02J 3/38* (2006.01)
*B63G 8/00* (2006.01)
(Continued)

(52) U.S. Cl.
CPC ............. *H02J 3/38* (2013.01); *B63G 8/001* (2013.01); *H02J 3/322* (2020.01); *H02J 3/40* (2013.01);
(Continued)

(58) Field of Classification Search
CPC ...... H02J 3/38; H02J 3/322; H02J 3/40; H02J 15/007; H02J 50/10; B63G 8/001; B63G 2008/002
See application file for complete search history.

(56) References Cited

U.S. PATENT DOCUMENTS 8,796,990 B2    8/2014 Paparo et al.
10,122,218 B2   11/2018 Corum et al.
(Continued)

FOREIGN PATENT DOCUMENTS

CN    114243938 A    3/2022

OTHER PUBLICATIONS

International Search Report and Written Opinion of the International Searching Authority dated Jun. 28, 2024 in connection with International Patent Application No. PCT/US2024/016276, 11 pages.

*Primary Examiner* — Jared Fureman
*Assistant Examiner* — Aqeel H Bukhari

(57) ABSTRACT

A system includes multiple electrical nodes connected in series to a primary power source via transmission lines. Each node includes a power converter that can receive first power from the primary power source or another upstream node. The power converter can change a voltage level and/or a frequency of the first power. Each node also includes a high-speed synchronous rotating machine (HSRM), which includes an inertial storage flywheel, a rotating excitation assembly, stator windings, and a synchronous motor coupled to an induction generator. The HSRM can boost a voltage level between an input and output to compensate for a voltage drop of the first power. At least one of the nodes further includes an inductive power coupler to electrically couple the node to a mobile power source that provides second power to the node and receives a portion of the first power from the node using contactless inductive power transfer. The system includes a combination of AC and DC power transmission techniques and associated bidirectional power converters.

21 Claims, 13 Drawing Sheets

(51) Int. Cl.
*H02J 3/32* (2006.01)
*H02J 3/40* (2006.01)
*H02J 15/00* (2006.01)
*H02J 50/10* (2016.01)

(52) U.S. Cl.
CPC ............ *H02J 15/007* (2020.01); *H02J 50/10* (2016.02); *B63G 2008/002* (2013.01)

(56) References Cited

U.S. PATENT DOCUMENTS

| | | |
|---|---|---|
| 11,183,846 B2 | 11/2021 | Kuznetsov |
| 11,489,367 B2 | 11/2022 | Kuznetsov |
| 2012/0025535 A1 | 2/2012 | Sihler et al. |
| 2013/0169044 A1 | 7/2013 | Stinessen et al. |
| 2018/0013312 A1 | 1/2018 | Moyer et al. |
| 2020/0373785 A1 | 11/2020 | Bagchi et al. |
| 2020/0395764 A1* | 12/2020 | Kuznetsov ............ H02J 15/007 |
| 2020/0395784 A1* | 12/2020 | Kuznetsov ............. B60L 50/52 |
| 2021/0305806 A1* | 9/2021 | Kawachi .................. H02J 3/46 |

* cited by examiner

MULTI-PORT SUBSEA HIGH-VOLTAGE POWER MODULATION AND STORED ENERGY DISTRIBUTION SYSTEM

TECHNICAL FIELD

This disclosure is directed in general to electrical power systems. More specifically, this disclosure relates to a multi-port subsea high-voltage power modulation and stored energy distribution system.

BACKGROUND

Conventional systems for high-voltage, long-distance (such as approximately 25-150 km) power transmission are confined to a single point of use at the end of a long transmission line, with no capability of intermediate power injection from a mobile source. Conventional systems typically use constant-current direct current (DC) transmission with static power electronic converters at each terminal and convert high-voltage DC to low-voltage DC at the receiving end. This limits these systems to steady-state loads (such as pumps) and does not provide capability for high-kilowatt pulsed loads such as sonar.

SUMMARY

This disclosure provides embodiments of a multi-port subsea high-voltage power modulation and stored energy distribution system.

In a first embodiment, a system includes multiple electrical nodes connected in series to a primary power source via multiple transmission lines. Each node includes a power converter configured to receive, via a corresponding one of the transmission lines, first power from the primary power source or another one of the multiple nodes upstream of the node. The power converter is configured to change at least one of a voltage level of the first power and a frequency of the first power. Each node also includes a high-speed synchronous rotating machine (HSRM), which includes an inertial storage flywheel, a rotating excitation assembly, multiple stator windings, and a synchronous motor coupled to an induction generator. The HSRM is configured to boost a voltage level between an input and an output to compensate for a voltage drop of the first power over a length of the corresponding transmission line. At least one of the nodes further includes an inductive power coupler configured to electrically couple the node to a mobile power source that is configured to (i) provide second power to the node and (ii) receive a portion of the first power from the node using contactless inductive power transfer.

In a second embodiment, a node includes a power converter configured to receive first power from a primary power source or an upstream node via a transmission line. The power converter is configured to change at least one of a voltage level of the first power and a frequency of the first power. The node also includes a HSRM, which includes an inertial storage flywheel, a rotating excitation assembly, multiple stator windings, and a synchronous motor coupled to an induction generator. The HSRM is configured to boost a voltage level between an input and an output to compensate for a voltage drop of the first power over a length of the transmission line. The node further includes an inductive power coupler configured to electrically couple the node to a mobile power source that is configured to (i) provide second power to the node and (ii) receive a portion of the first power from the node using contactless inductive power transfer.

In a third embodiment, a system includes a land-based primary power source, a first node connected to the primary power source via a first transmission line, a second node connected to the first node via a second transmission line, and a third node connected to the second node via a third transmission line. Each of the first, second, and third nodes includes a power converter configured to receive, via a corresponding one of the transmission lines, first power from the primary power source or another one of the nodes. The power converter is configured to change at least one of a voltage level of the first power and a frequency of the first power. Each node also includes a HSRM, which includes an inertial storage flywheel, a rotating excitation assembly, multiple stator windings, and a synchronous motor coupled to an induction generator. The HSRM is configured to boost a voltage level between an input and an output to compensate for a voltage drop of the first power over a length of the corresponding transmission line. At least one of the first, second, and third nodes further includes an inductive power coupler configured to electrically couple the node to a mobile power source that is configured to (i) provide second power to the node and (ii) receive a portion of the first power from the node using contactless inductive power transfer. The first transmission line includes a direct current (DC) transmission line and at least one of the second and third transmission lines includes an alternating current (AC) transmission line.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
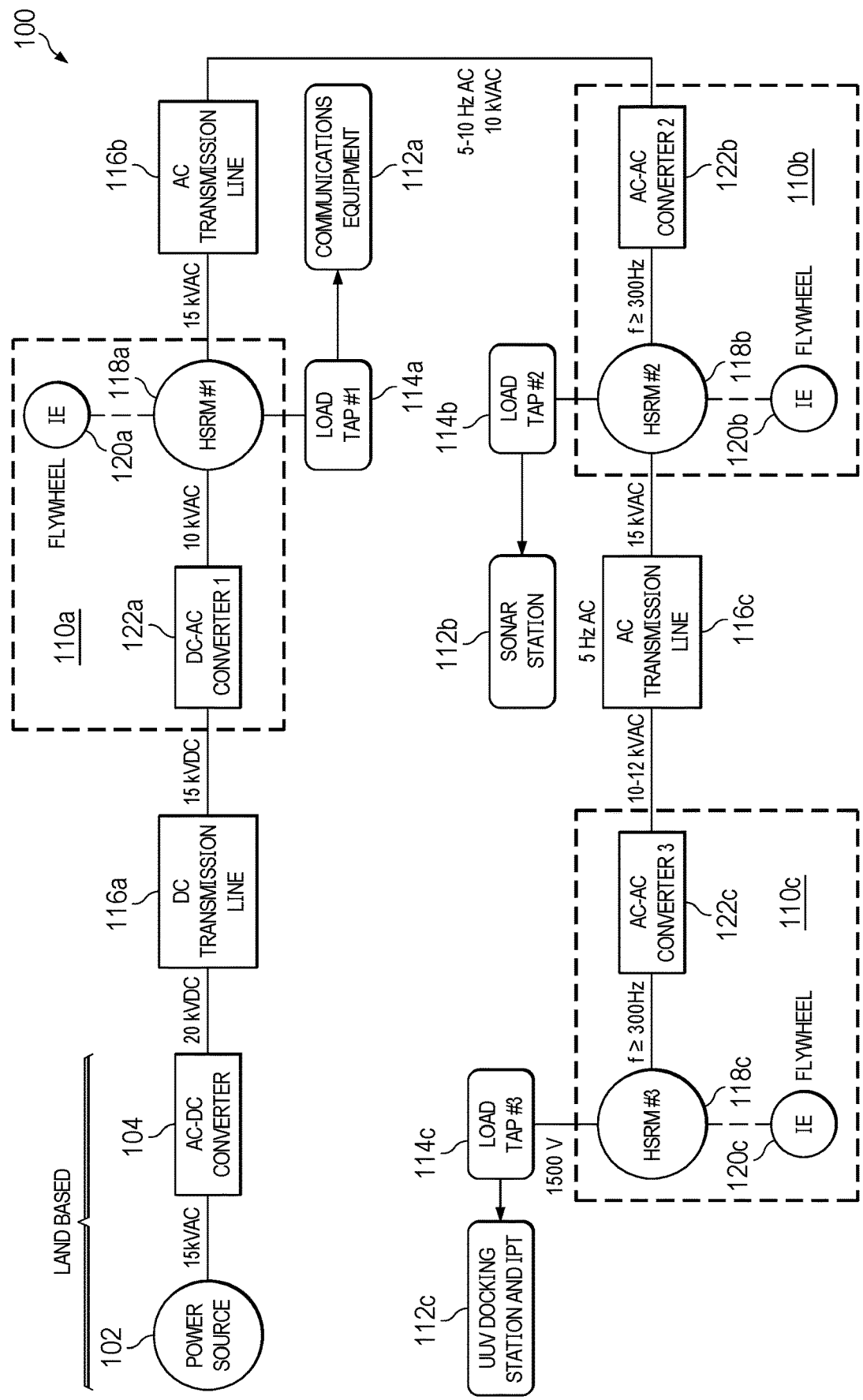
FIG. 1 illustrates an example high-voltage power modulation and energy distribution system according to this disclosure.

FIGS. 1 through 12, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, conventional systems for high-voltage, long-distance (such as approximately 25-150 km) power transmission are confined to a single point of use at the end of a long transmission line, with no capability of intermediate power injection from a mobile source. Conventional systems typically use constant-current direct current (DC) transmission with static power electronic converters at each terminal and convert high-voltage DC to low-voltage DC at the receiving end. This limits these systems to steady-state loads (such as pumps) and does not provide capability for high-kilowatt pulsed loads such as sonar. In addition, conventional systems do not offer a solution for multiple tap points or an intermediate power feed on a transmission line.

This disclosure provides embodiments of a multi-port subsea high-voltage power modulation and stored energy distribution system. Among other things, the disclosed embodiments provide a high-voltage direct current (HVDC) or high-voltage alternating current (HVAC) transmission system with multiple tap points, which can include an unmanned underwater vehicle (UUV) mobile power source input or a renewable energy underwater power source and can accommodate widely-different loads utilizing one or more synchronous-induction electrical machines. Each load can have a different impedance or different power requirements, with wide variation over time for pulsed loads, which are generally stochastic. The disclosed embodiments feature a node with a central rotating electrical machine to mix incoming and outgoing power, as well as convert kinetic energy (such as inertial flywheel energy) into useable electric power that may be used further downstream or used locally (such as to feed a UUV, a submarine, or another load). The electrical machine and its energy storage unit are bidirectional in power and energy such that the electrical machine may absorb power brought in by a UUV or other source to the node or transmit the power to one or more UUVs or other destinations at each node. In addition, the disclosed embodiments can have a smaller form factor than conventional systems.

It will be understood that embodiments of this disclosure may include any one, more than one, or all of the features described here. Also, embodiments of this disclosure may additionally or alternatively include other features not listed here. While the disclosed embodiments may be described with respect to naval ships, UUVs, and naval power systems, these embodiments are also applicable in any other suitable systems or applications.

FIG. 1 illustrates an example high-voltage power modulation and energy distribution system 100 according to this disclosure. As described in greater detail below, the system 100 is a high-voltage system with a single power source and multiple tap points for multiple loads. The system 100 features mixed AC and DC transmission and variable voltage boost capability.

As shown in FIG. 1, the system 100 includes a land-based power source 102. The power source 102 can be a utility power source, a system-dedicated power generator, or any other suitable power source. As a particular example, the power source 102 may generate AC power at approximately 15 kV. The AC power is input to an AC-DC converter 104, which converts the AC power to DC power. In some embodiments, the AC-DC converter 104 also increases the power voltage. As a particular example, the output of the AC-DC converter 104 may be approximately 20 kV DC. It will be understood that these voltages (and other system voltages discussed below) are merely examples, and other voltages are possible and within the scope of this disclosure.

The power source 102 is connected in series with and provides power to multiple nodes 110a-110c. Each node 110a-110c is associated with a corresponding load 112a-112c. The loads 112a-112c are sea-based or underwater loads and are typically pulsed loads, although non-pulsed loads may be used. Different loads 112a-112c can represent different equipment with different power requirements. For example, the load 112a can include communications equipment, the load 112b can include a sonar station, and the load 112c can include a UUV docking station with an inductive power transfer (IPT) capability for charging or powering a UUV. Each of the loads 112a-112c can couple to the corresponding node 110a-110c at a corresponding load tap point 114a-114c. In some embodiments, the pulsed load repetition rate of any individual load 112a-112c may be approximately 5-30 Hz. Also, in some embodiments, the slew rate of any individual load 112a-112c may be approximately 1-3 MW/s. While the system 100 is described as including three nodes 110a-110c and three loads 112a-112c, other numbers of nodes and loads are possible.

The nodes 110a-110c are connected to the power source 102 and to each other in a series configuration and are separated from each other by transmission lines 116a-116c. For example, the transmission line 116a connects the AC-DC converter 104 to the first node 110a in the series, the transmission line 116b connects the first node 110a to the second node 110b in the series, and the transmission line 116c connects the second node 110b to the third node 110c in the series. Due to the physical distances between the different loads 112a-112c, the transmission lines 116a-116c are typically multiple kilometers long. In some embodiments, the transmission lines 116a-116c can include a mix of AC and DC transmission lines. For example, the transmission line 116a can be a DC transmission line, while the transmission lines 116b and 116c can be AC transmission lines. The type and voltage of current carried in each transmission line 116a-116c can be determined, at least in part, on the length of each transmission line 116a-116c. For instance, short transmission lines (such as less than approximately 10 km in length) may carry low- or medium-voltage AC current (such as approximately 10-15 kV). Medium-length transmission lines (such as approximately 15 km in length) may carry AC current at higher voltages (such as approximately 15-30 KV). Long-distance transmission lines (such as greater than approximately 25 km in length) can carry high-voltage DC current (such as approximately 20-50 KV). Each transmission line 116a-116c can exhibit a voltage drop (such as approximately 3-5 kV) along its length.

Each node 110a-110c includes multiple components for converting, modulating, and storing power from the power source 102. For example, each node 110a-110c includes a high-speed synchronous rotating machine (HSRM) 118a-118c coupled to an inertial energy storage 120a-120c (such as a flywheel), as well as a power converter 122a-122c. Each HSRM 118a-118c is a multi-port synchronous input/induction output electrical machine that has one input stator port and two output stator ports in addition to a rotor port that can accept minor excitation power. Each HSRM 118a-118c represents independent rotating compact machinery for supplying power and stored energy for its corresponding load 112a-112c. This allows the overall system 100 to be a single-power source, multi-tap system that can accommodate multiple loads. This arrangement can also provide total isolation of pulsed effectors (if used) from pulsed sensor loads (such as sonar) and buffers the transmission lines 116a-116c and the power source 102 from rapid fluctuations in power.

At least the first two HSRMs 118a and 118b in the series can boost the voltage level from its input port to its output port. For example, the HSRMs 118a and 118b can boost voltage from approximately 10 kVAC input to approximately 15 kVAC output. In some embodiments, the HSRMs 118a and 118b can have a stator output of approximately 755 VAC, three-phase or rectified, or approximately 1.0 kVDC depending on the corresponding load 112a and 112b. Also, in some embodiments, the HSRM 118c can have an approximately 12 KVAC input and an approximately 1.500 VAC, six-phase output. Further, in some embodiments, one or more of the HSRMs 118a-118c can have a synchronous motor rating of approximately 500 kW, 32 poles, and a 1125 revolutions-per-minute (RPM) base speed. The inertial energy storage 120a-120c may be driven through a step-up gearbox to a higher speed, for example, 20,000 rpm. Of course, these parameters are mere examples, and other values are possible.

Each corresponding inertial energy storage 120a-120c is configured to have energy storage capability matched to the worst-case energy draw condition at each tap point 114a-114c, which allows the inertial energy storages 120a-120c to buffer the transmission lines 116a-116c from pulsations. The inertial energy storages 120a-120c can also buffer the loads 112a-112c from interacting with other mobile power sources, such as described in other embodiments below.

The power converters 122a-122c can be DC-AC or AC-AC converters depending on the transmission line 116a-116c from which the power converter 122a-112c receives power. In some embodiments, the power converter 122a can be an approximately 15 KVDC to approximately 13.8 kV, three-phase, approximately 10 Hz DC-AC converter configured to feed the HSRM 118a. Also, in some embodiments, the power converter 122b can be an approximately 10 kVAC at 10 Hz to approximately 2 KVAC, approximately 300 Hz output AC-AC converter configured to feed the HSRM 118b. In addition, in some embodiments, the power converter 122c can be an approximately 12 kVAC input at 5 Hz to approximately 4 kVAC, approximately 10 Hz input, approximately 300 Hz output AC-AC converter configured to feed the HSRM 118c. Of course, these parameters are mere examples, and other values are possible.

As described above, the overall architecture of the system 100 allows for a substantially constant-current transmission at a high voltage level, where the HSRMs 118a-118c are configured to boost voltage along the long line and transform the power to a lower voltage level for final distribution. As described in greater detail below, each HSRMs 118a-118c has windings to regulate its output load current, reactive power, and real power to suit a wide range of individual tap-point loads. Impedance transformation can be performed within the HSRMs 118a-118c, which can be serially connected with galvanically-isolated input and output windings. The AC transmission may be either single phase or polyphase.

Although FIG. 1 illustrates one example of a high-voltage power modulation and energy distribution system 100, various changes may be made to FIG. 1. For example, the system 100 may include any number of nodes 110a-110c and their corresponding components and any number of loads 112a-112c. Also, various components in the system 100 may be combined, further subdivided, replicated, rearranged, or omitted and additional components may be added according to particular needs. In addition, while FIG. 1 illustrates one example system for high-voltage power modulation and energy distribution, this functionality may be used in any other suitable system.

Figure 2:
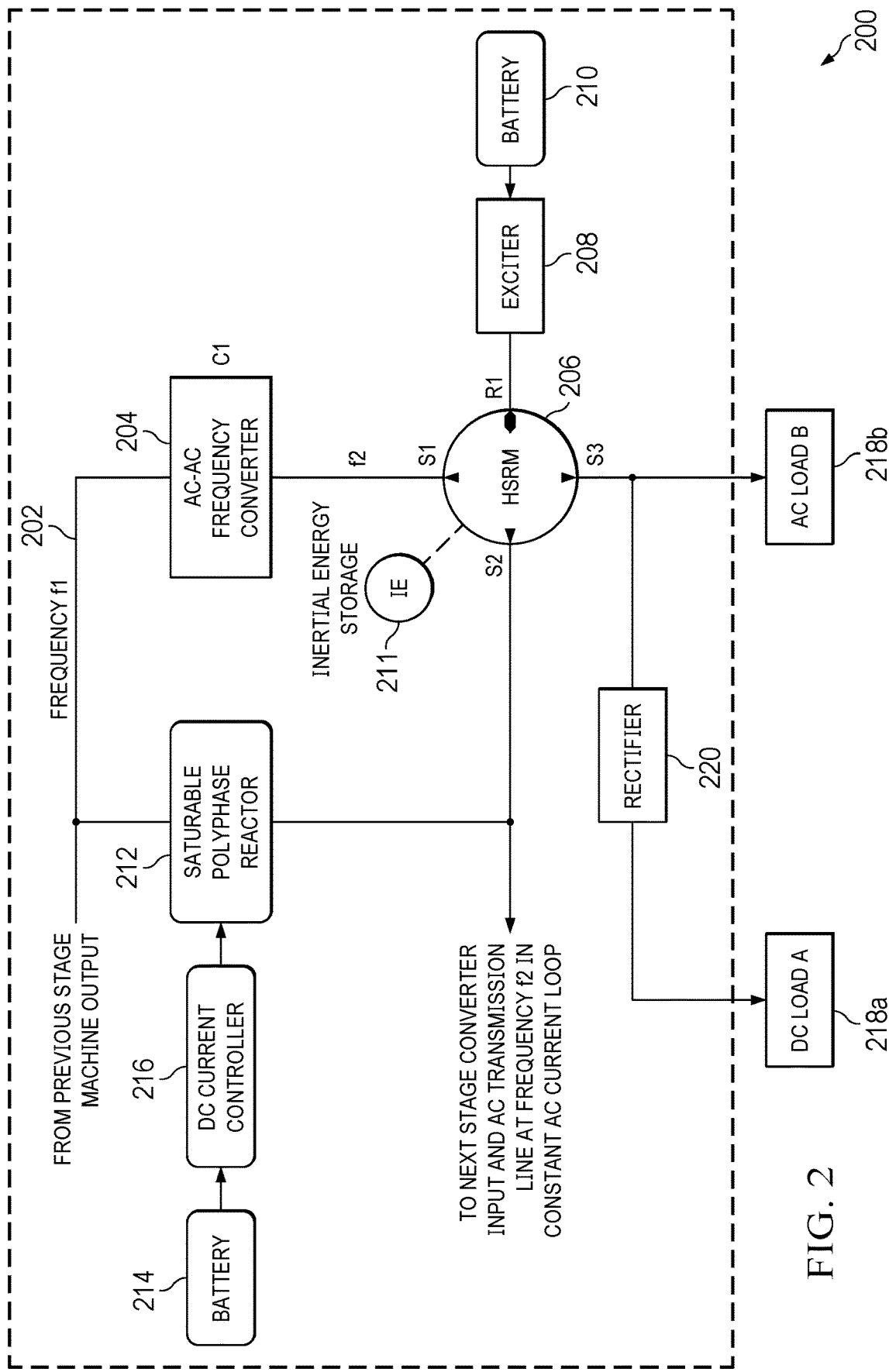
FIG. 2 illustrates an example node for use in a high-voltage power modulation and energy distribution system according to this disclosure.

FIG. 2 illustrates an example node 200 for use in a high-voltage power modulation and energy distribution system according to this disclosure. In some embodiments, the node 200 can represent (or be represented by) one of the nodes 110a-110c of FIG. 1. However, the node 200 could be used with any other suitable device or system.

As shown in FIG. 2, the node 200 includes multiple components that are the same as or similar to those shown in FIG. 1, and a detailed description will not be repeated here. The node 200 has an input 202 that receives power from a previous node (such as the node 110a) or from a power source (such as the power source 102). The received power is converted at an AC-AC power converter 204, which operates to change the voltage, frequency, or both of the received power. In some embodiments, the AC-AC power converter 204 converts the frequency of the received power from a frequency f1 of approximately 10 Hz to a frequency f2 in a range of approximately 50-500 Hz. The power is input to a HSRM 206, which can represent one of the HSRMs 118a-118c. The HSRM 206 is coupled to an inertial energy storage subsystem 211, which can be a flywheel.

The HSRM 206 includes a rotor port and windings R1 and multiple stator ports and windings S1, S2, and S3. The rotor R1 includes a DC input port that receives DC power from a rotor exciter 208. The rotor exciter 208 provides a fixed excitation current along with primary input to the port S1 to cause the HSRM 206 to rotate. The rotor exciter 208 is powered by a power source, such as a battery 210 (although other power sources are possible). The stator S1 is a polyphase input stator winding, and the stators S2 and S3 are polyphase output stator windings. In some embodiments, each of the ports associated with R1, S1, S2, S3 may have a power rating within a 6:1 ratio of every other port and a load impedance range of 6:1 from a light load condition to a full load condition, with a wide range of pulse repetition frequencies. However, other designs of the ports are possible.

Power output can be directed from the HSRM 206 to the two output stators S2 and S3. For example, power can be supplied to a subsequent node in the series (such as the node 110c) via the stator S2, and power can be supplied to one or more loads 218a-218b via the stator S3. In FIG. 2, there are two loads, namely a DC load 218a and an AC load 218b. In some embodiments, the loads 218a-218b may be pulsed loads. However, other numbers and types of loads are possible. A rectifier 220 disposed between the stator S3 and the DC load 218a can convert the AC power from the HSRM 206 to DC power for the DC load 218a. Attached to the input to the node 200 and to the output line or S2 port is a saturable polyphase reactor 212. The shunt connection of the saturable polyphase reactor 212 can offset changes in the impedance of the HSRM 206 from input to output due to varying pulsed loads. The saturable polyphase reactor 212 receives control power from a power source, such as a battery 214, which can be controlled by a DC current controller 216.

Although FIG. 2 illustrates one example of a node 200 for use in a high-voltage power modulation and energy distribution system, various changes may be made to FIG. 2. For example, the node 200 may include or be used with any number of loads 218a-218b. Also, various components in the node 200 may be combined, further subdivided, replicated, rearranged, or omitted and additional components may be added according to particular needs. In addition, while FIG. 2 illustrates one example node for use in high-voltage power modulation and energy distribution, this functionality may be used in any other suitable system.

Figure 3:
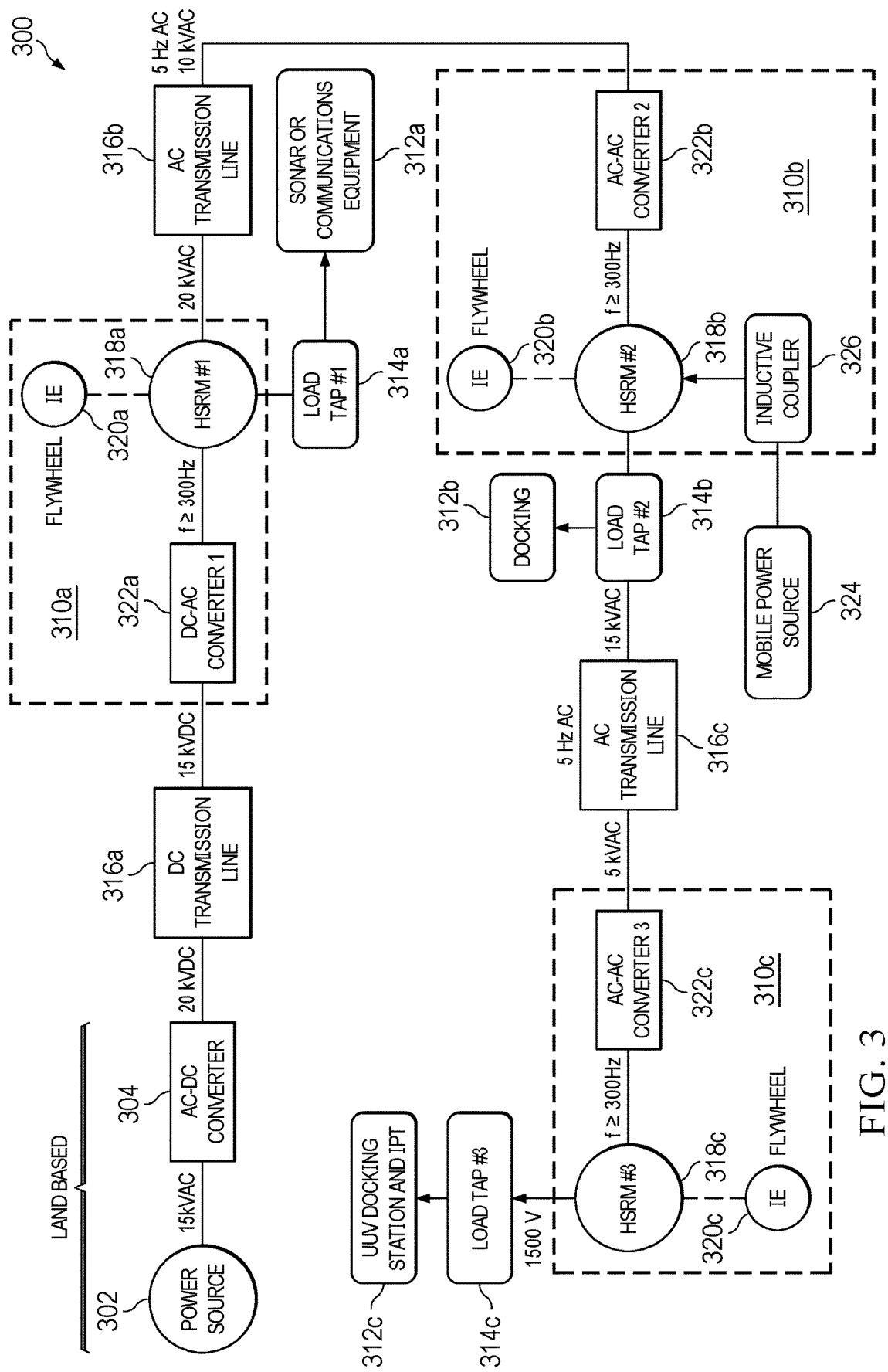
FIG. 3 illustrates another example high-voltage power modulation and energy distribution system according to this disclosure.

FIG. 3 illustrates another example high-voltage power modulation and energy distribution system 300 according to this disclosure. The system 300 is a high-voltage system with two sources, namely one land-based power source and one mobile power source (which can be subsea). As shown in FIG. 3, the system 300 includes a power source 302, an AC-DC power converter 304, multiple nodes 310a-310c, multiple loads 312a-312c, multiple load taps 314a-314c, multiple transmission lines 316a-316c, multiple HSRMs 318a-318c, multiple inertial energy storage flywheels 320a-320c, and multiple power converters 322a-322c. These components may be the same as or similar to corresponding components in the system 100 of FIG. 1, and a detailed description will not be repeated here. The system 300 is configured to boost system voltage twice, once in the node 310a (such as from approximately 15 kVDC to approximately 20 kVAC) and once in the node 310b (such as from approximately 10 kVAC to approximately 15 kVAC).

The two AC-AC converters 322b and 322c are bidirectional in power flow. Each AC-AC converter 322b and 322c has the ability to change frequency from its input port to its output port. Additional details of the converters 322b and 322c are provided below (such as in conjunction with FIG. 6). The pulsed loads 312a and 312c are coupled to independent HSRMs 318a and 318c for their respective power and stored energy feeds. This allows the multi-tap system 300 to suit multiple load stations. The inertial energy storage capacity of each HSRM 318a-318c can be tailored to each load site and power demand.

Each HSRM 318a-318c includes a synchronous wound-field polyphase motor (of one input port) directly attached to a wound-rotor polyphase induction generator (of two or more ports). This design allows an output voltage different from that of the synchronous motor. In general, the output port provides a boost of voltage to compensate for long transmission line impedance drop. When the induction generator is outputting power under inertial boost, the rotor excitation is increased in frequency as the shaft speed decreases to yield a substantially constant stator output frequency, which is sent to either the downstream transmission line 316b and 316c or the nearby load 312a-312c. In some cases, rotor AC excitation can be provided by a battery or a step-down transformer connected to the main line and then to a power converter with polyphase AC output for excitation control. A shunt connection of a polyphase saturable reactor can offset changes in impedance of machine input to output with varying pulsed loads.

As shown in FIG. 3, the system 300 also includes a mobile power source 324, which connects to the induction generator of the HSRM 318b via an inductive power coupler 326. The mobile power source 324 can be a subsea vehicle, such as a UUV or submarine, in which case the inductive power coupler 326 is underwater. The mobile power source 324 can include a charged battery or a generator that can provide power (such as polyphase AC power) that can be input to the induction machine stator of the HSRM 318b. Thus, the mobile power source 324 provides a second independent power source for the system 300, in addition to the land-based power source 302. In some embodiments, the power received from the mobile power source 324 is sent downstream (such as to the node 310c), upstream (such as to the node 310a), or both.

Figure 4:
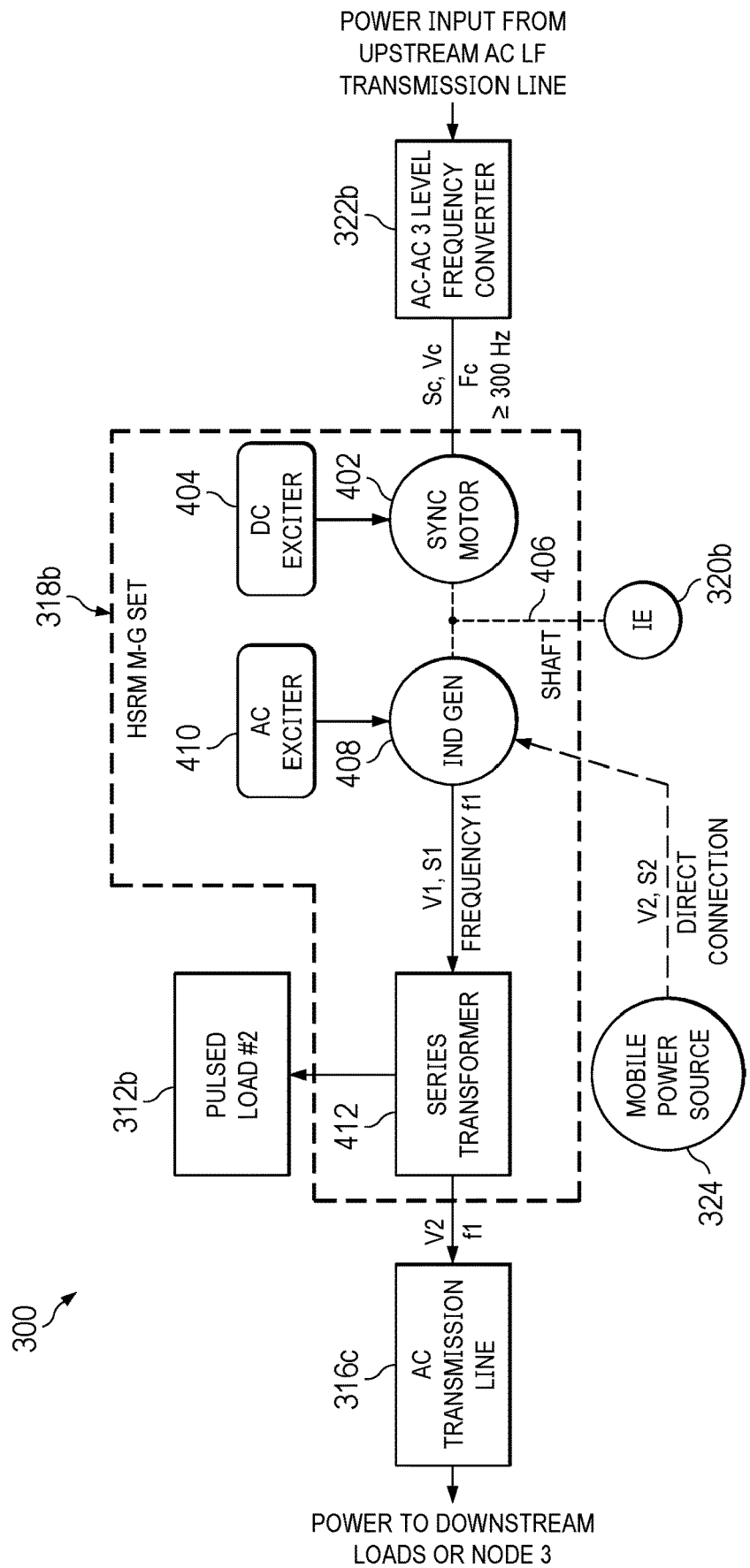
FIGS. 4 and 5 illustrate further details of an example use of a mobile power source in the system of FIG. 3 according to this disclosure.
Figure 5:
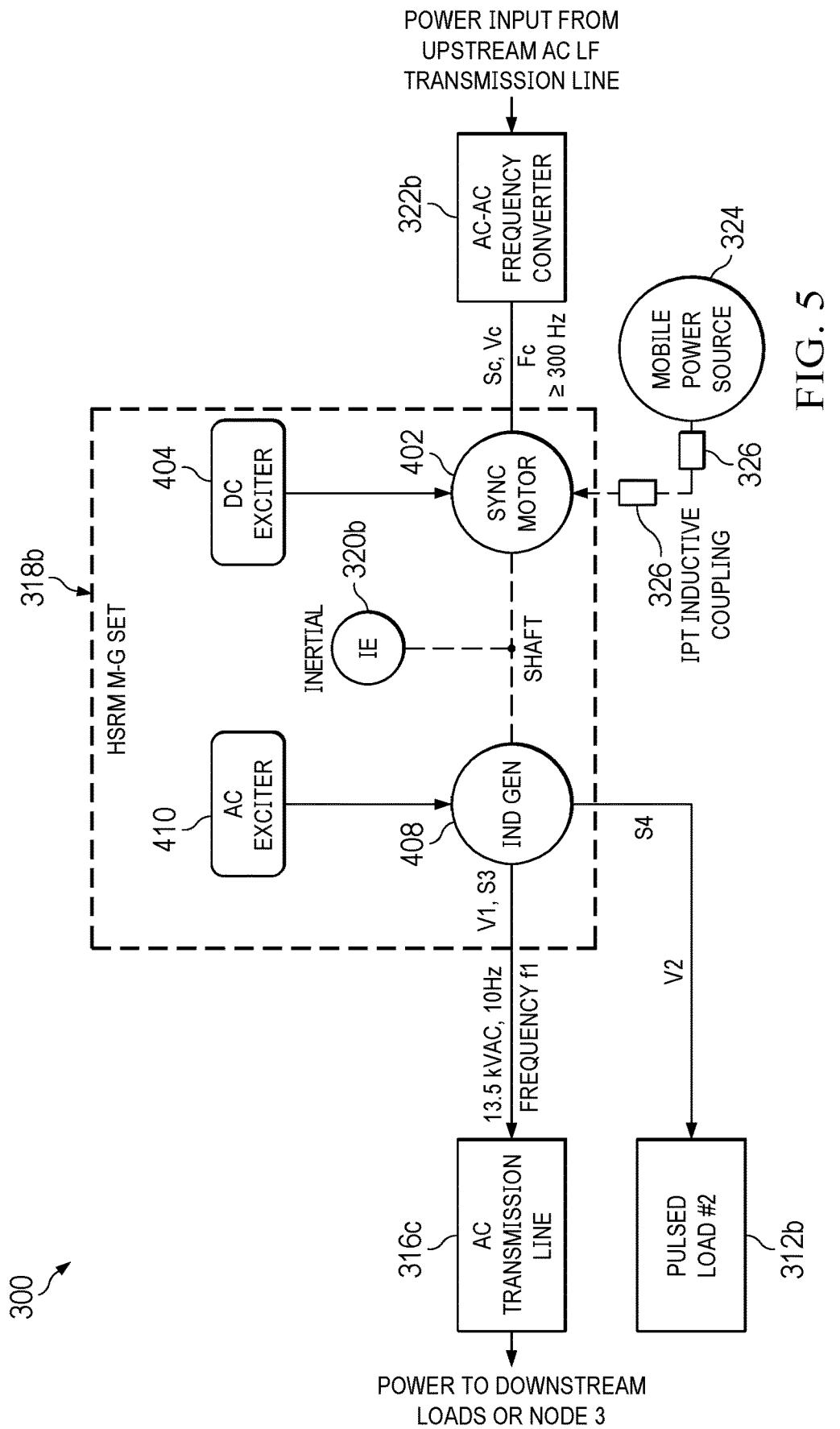

FIGS. 4 and 5 illustrate further details of an example use of a mobile power source 324 in the system 300 of FIG. 3 according to this disclosure. As shown in FIG. 4, the HSRM 318b includes a synchronous motor 402 with a DC exciter 404 (such as a battery or separate power supply). The synchronous motor 402 drives a shaft 406, where the shaft 406 is coupled to the inertial energy storage flywheel 320b and an induction generator 408 with its own AC exciter 410. In some embodiments, the induction generator 408 is an approximately 500 KW, four-pole generator with negative sequence excitation. The induction generator 408 has two stator windings S1 and S2. The stator winding S2 receives or sends the bidirectional power from/to the mobile power source 324. The stator winding S1 includes an output port with a polyphase winding and provides power to one or more other downstream nodes or loads. A polyphase series transformer 412 boosts the power voltage output from the induction generator 408.

In FIG. 5, the mobile power source 324 is coupled to the synchronous motor 402 through the inductive power coupler 326. The mobile power source 324 can add extra power to or receive power (such as in the case of a UUV) from the node 310b via inductive power transfer (IPT) at the inductive power coupler 326. The load 312b is powered by a separate polyphase output stator S4 port on the induction generator 408 (and an optional rectifier if the load 312b is DC powered). As shown in FIG. 5, in some embodiments, the voltage is boosted in magnitude from approximately 9 kV to approximately 13.5 kV at the node 310b in order to compensate for large voltage drops inherent in the next transmission line stage. The inertial energy storage flywheel 320b may be configured to be fully bidirectional in power/energy flow. The flywheel 320b may be attached to the shaft via a step-up gearbox or directly connected.

As shown in FIGS. 3 through 5, the mobile power source 324 can add extra power to or receive energy from the node 310b. Excitation of the rotor of the HSRM 318b, combined with the optional intermediate power injection from the mobile power source 324, provides a wide range of efficient control at the node 310b. The embodiments shown in FIGS.

3 through 5 are unique in having multiple power source injection points and multiple load taps. The use of medium frequency (such as approximately 300 to 3000 Hz) for the underwater IPT coupling makes this power injection compact and efficient. In some embodiments, the HSRMs 318a-318c provide both positive resistance and negative resistance input-output characteristics. As used here, negative resistance means that, as the load is increasing in power demand, the applied voltage will increase rather than decrease.

Although FIGS. 3 through 5 illustrate another example of a high-voltage power modulation and energy distribution system 300 and related details, various changes may be made to FIGS. 3 through 5. For example, the system 300 may include any number of nodes 310a-310c and their corresponding components and any number of loads 312a-312c. Also, the mobile power source 324 may be connected to an HSRM other than the HSRM 318b. The stored energy in the inertial energy storage flywheel 320b may be used locally or sent to another node, either upstream or downstream. Further, various components in the system 300 may be combined, further subdivided, replicated, rearranged, or omitted and additional components may be added according to particular needs. In addition, while FIGS. 3 through 5 illustrate one example system for high-voltage power modulation and energy distribution, this functionality may be used in any other suitable system.

Figure 6:
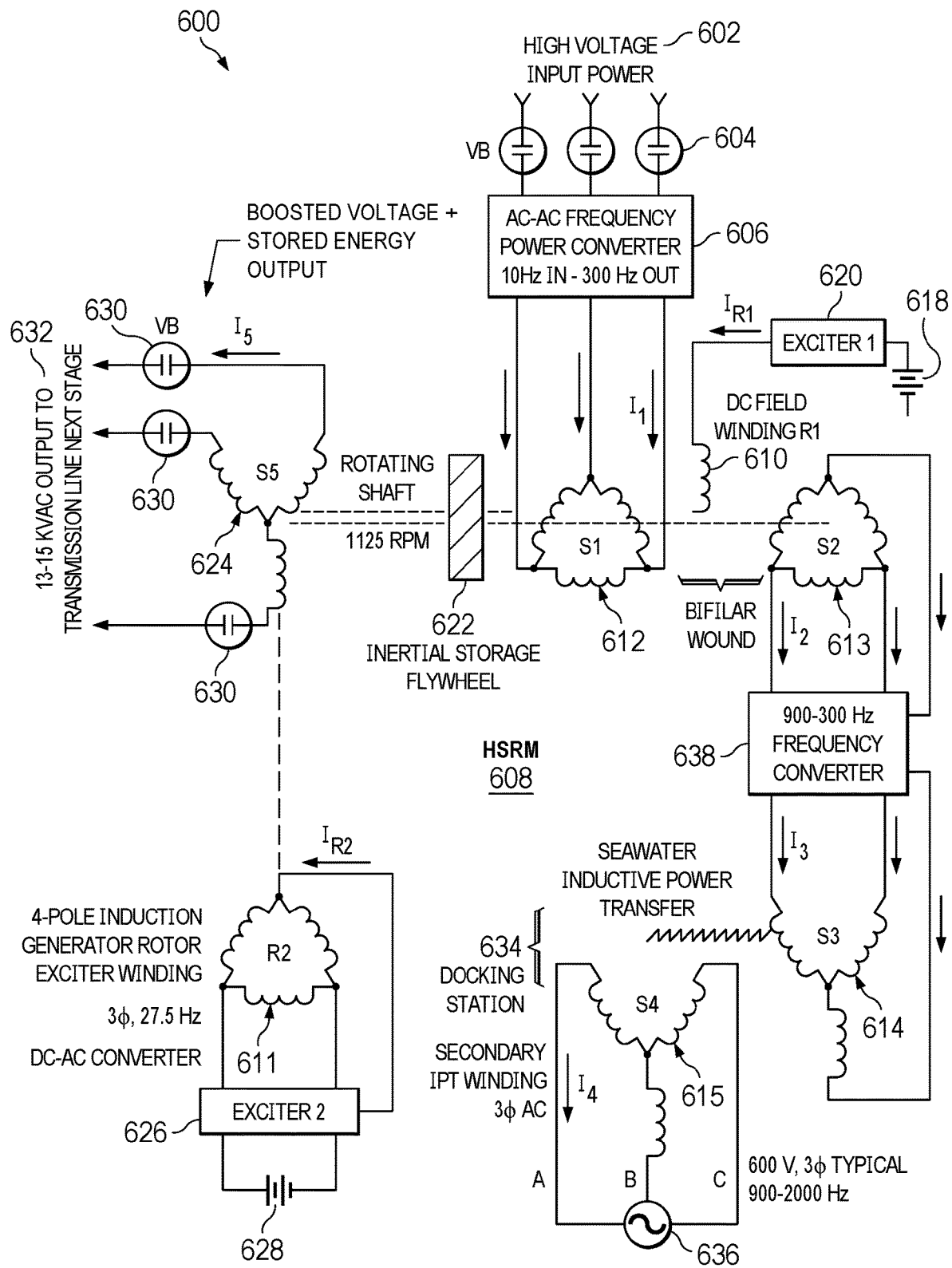
FIG. 6 illustrates another example node for use in a high-voltage power modulation and energy distribution system according to this disclosure.

FIG. 6 illustrates another example node 600 for use in a high-voltage power modulation and energy distribution system according to this disclosure. In some embodiments, the node 600 can represent (or be represented by) one of the nodes 110a-110c of FIG. 1 or one of the nodes 310a-310c of FIG. 3. However, the node 600 could be used with any other suitable device or system.

As shown in FIG. 6, the node 600 includes multiple components that may be the same as or similar to those shown in earlier figures, and a detailed description will not be repeated here. The node 600 is a bidirectional energy node in a larger system (such as the system 100 or the system 300) of multiple power nodes, which are serially connected in a high-voltage string. The node 600 can receive electrical power from a central (typically land-based) power source and deliver this power to subsequent nodes in the series. The node 600 can also receive and mix electrical power from a mobile source, such as a submarine or UUV. Thus, the node 600 can receive power from two or more sources. In contrast, conventional systems have nodes that are limited to only being able to deliver power to a mobile load but cannot receive power at a "tap" point. The node 600 features a low-frequency (such as approximately 5-10 Hz) AC transmission line input and a low-frequency (such as approximately 5-10 Hz) AC transmission line output. The output can have a higher potential than the input, which compensates for a long distance voltage drop due to line inductance and line resistance. In some embodiments, the node 600 may operate at high power levels (such as approximately 400 KW to 5 MW) and storage capacities (such as approximately 10-150 MJ).

The node 600 receives high voltage (such as approximately 10 kV), low frequency (such as approximately 10 Hz) power 602 from a previous node via an upstream input transmission line. The power 602 passes through one or more input vacuum breakers 604 before being input to an AC-to-AC power converter 606. The AC-to-AC power converter 606 operates to change the low frequency power 602 to medium frequency (such as approximately 300 Hz), which is provided as input to a HSRM 608. The HSRM 608 includes rotors 610 ("R1") and 611 ("R2") and machine stators 612 ("S1"), 613 ("S2"), and 624 ("S5"). The HSRM 608 also includes IPT stators 614 ("S3") and 615 ("S4"). The rotor R1 includes a synchronous motor rotor DC-excitation winding coupled to an excitation power supply 618 (such as a battery) and an excitation controller 620 for DC rotor field. The stator S1 may include a main synchronous motor stator input winding of 32 poles (such as operating at approximately 300 Hz) and closely magnetically coupled to the stator S1. The stator S2 is an auxiliary or synchronous motor stator output winding of 32 poles (such as at approximately 300 Hz). The inductive power transfer primary stator S3 may include the high-voltage output port, and the inductive power transfer secondary stator S4 may include the low voltage output port for local sensor loads.

In some embodiments, the HSRM 608 features an approximately 900 Hz 32-pole synchronous motor input. The HSRM 608 is coupled to an inertial storage flywheel 622 on the same shaft as the synchronous motor. In some embodiments, the baseline shaft speed is approximately 1125 RPM. The HSRM 608 is also coupled to an induction generator 624 for output power delivery with active rotor AC excitation, such as at approximately 27 Hz. The induction generator 624 is on the same shaft as the flywheel 622 and the HSRM synchronous motor. In some embodiments, the induction generator 624 is a wound-field induction generator/motor and includes four poles on the stator winding S5 to yield an approximately 10 Hz or similar low frequency output. The rotor 611 includes a polyphase AC rotor excitation winding for the induction generator 624. The winding receives excitation from an excitation polyphase AC rotor power supply 626 and a DC power source or battery or super-capacitor 628.

Output high-voltage vacuum circuit breakers 630 are connected between the induction generator 624 and the downstream transmission line 632. The downstream transmission line 632 can be a polyphase AC transmission line at a higher voltage than the incoming transmission line (such as at approximately 13-15 KVAC). In some embodiments, the downstream transmission line 632 may alternatively be a two-wire single-phase line. Typically, a three-phase three-wire line may be more efficient.

The node 600 also includes a docking station 634 that has an IPT contactless subsystem to interface between the HSRM 608 and a mobile power source 636, which could be a UUV, a submarine, a small turbine generator, or an ocean wave electric generator. The mobile power source 636 is capable of receiving and sending AC power at medium frequency across a liquid gap, such as seawater, through the IPT magnetic field. The docking station 634 uses primarily low-voltage high-frequency AC distribution through the windings 614 and 615, whereas the main transmission lines in and out of the node 600 are either low-frequency high-voltage AC or high-voltage DC. The IPT contactless subsystem ensures that there is no need for underwater exposed electrical contacts, which are subject to corrosion. While FIG. 6 shows only one docking station 634, the node 600 may have multiple docking stations 634 fed from one HSRM 608. A medium-frequency power converter 638 in between the stators 613 and 614 converts a machine output frequency (such as approximately 300 Hz) to a higher frequency (such as approximately 900-2000 Hz), which in some embodiments may be useful for an IPT device on the sending end of the docking station 634.

The stator 614 includes a IPT polyphase stator-wound primary unit, which helps to create the magnetic field in the liquid gap at a higher frequency. The stator 615 includes a IPT polyphase wound secondary unit that is attached to the mobile power source 636. Tap points A, B, and C electrically coupled to the mobile power source 636 indicate that the load may be complex, such as including multiple loads and mixing both sink and source devices. U.S. Pat. No. 11,489,367 (which is incorporated herein by reference) provides further details of one example embodiment of a polyphase inductive power transfer system across liquid gaps including seawater, although other embodiments may be used.

The multi-port arrangement in the HSRM 608 of the combined synchronous input windings (S1 and S2) and induction unit output windings (S3 and S4) allows bidirectional power flow to cover multiple use cases. AC currents I1, I2, I3, and I4 allow bidirectional power flow. Output current I5 may also allow bidirectional power flow. For example, in a first case, the mobile power source 636 can inject power into the node 600 to either charge the inertial storage flywheel 622 or directly power the next transmission stage or node. In a second case, the mobile power source 636 can inject generated power to upstream and downstream nodes and transmission lines simultaneously. In a third case, the mobile power source 636 (in the form of a power sink) can access the node 600 through contactless IPT and draw power from either the inertial storage flywheel 622 or from an adjacent node or transmission line. Similarly, the energy to charge the inertial storage flywheel 622 can be derived from three sources: (i) an upstream transmission line or node, (ii) a downstream transmission line or node, or (iii) the mobile power source 636. These sources can be mixed through operation of the HSRM 608.

There are also multiple techniques to regulate and control power into and out of the inertial storage flywheel 622. For example, in a first technique, DC excitation to the synchronous motor (such as the synchronous motor 402) of the HSRM 608 can be adjusted, and the synchronous motor can also operate as a synchronous generator if in a mode to yield energy back to an upstream node. In a second technique, AC excitation to the wound-field induction generator (such as the induction generator 408) of the HSRM 608 can be adjusted, and the wound-field induction generator can also operate as an induction motor in certain modes (such as if energy is coming from the downstream transmission line), therefore allowing input energy to charge up the flywheel speed/energy. In a third technique, the output frequency of the AC-to-AC power converter 606 can be regulated, which sets the speed of the synchronous motor shaft and therefore kinetic energy. In a fourth technique, the output frequency of the IPT power converter 638 can be regulated, which can also set the speed of the synchronous motor shaft and therefore kinetic energy (if it overrides the output from the third technique).

In some embodiments, the rotor winding for the HSRM 608 can operate in a "negative-sequence" mode such that the excitation frequency (such as approximately 27.5 Hz) is subtracted from the main magnetic field frequency (such as approximately 37.5 Hz if the shaft speed is approximately 1125 RPM) to yield a lower frequency output on the stator (such as approximately 10 Hz). The node 600 may not need to use discrete transformers to raise the output voltage above the incoming transmission voltage. For example, the design of the induction machine stators in the HSRM 608 provides an output voltage to subsequent downstream nodes at substantially higher voltage levels than the input port, which is a significant system advantage with long transmission lines and improves overall efficiency.

Although FIG. 6 illustrates another example of a node 600 for use in a high-voltage power modulation and energy distribution system, various changes may be made to FIG. 6. For example, the node 600 may be coupled to any suitable number of upstream and downstream nodes and transmission lines. Also, various components in the node 600 may be combined, further subdivided, replicated, rearranged, or omitted and additional components may be added according to particular needs. In addition, while FIG. 6 illustrates one example node for use in high-voltage power modulation and energy distribution, this functionality may be used in any other suitable system.

Figure 7:
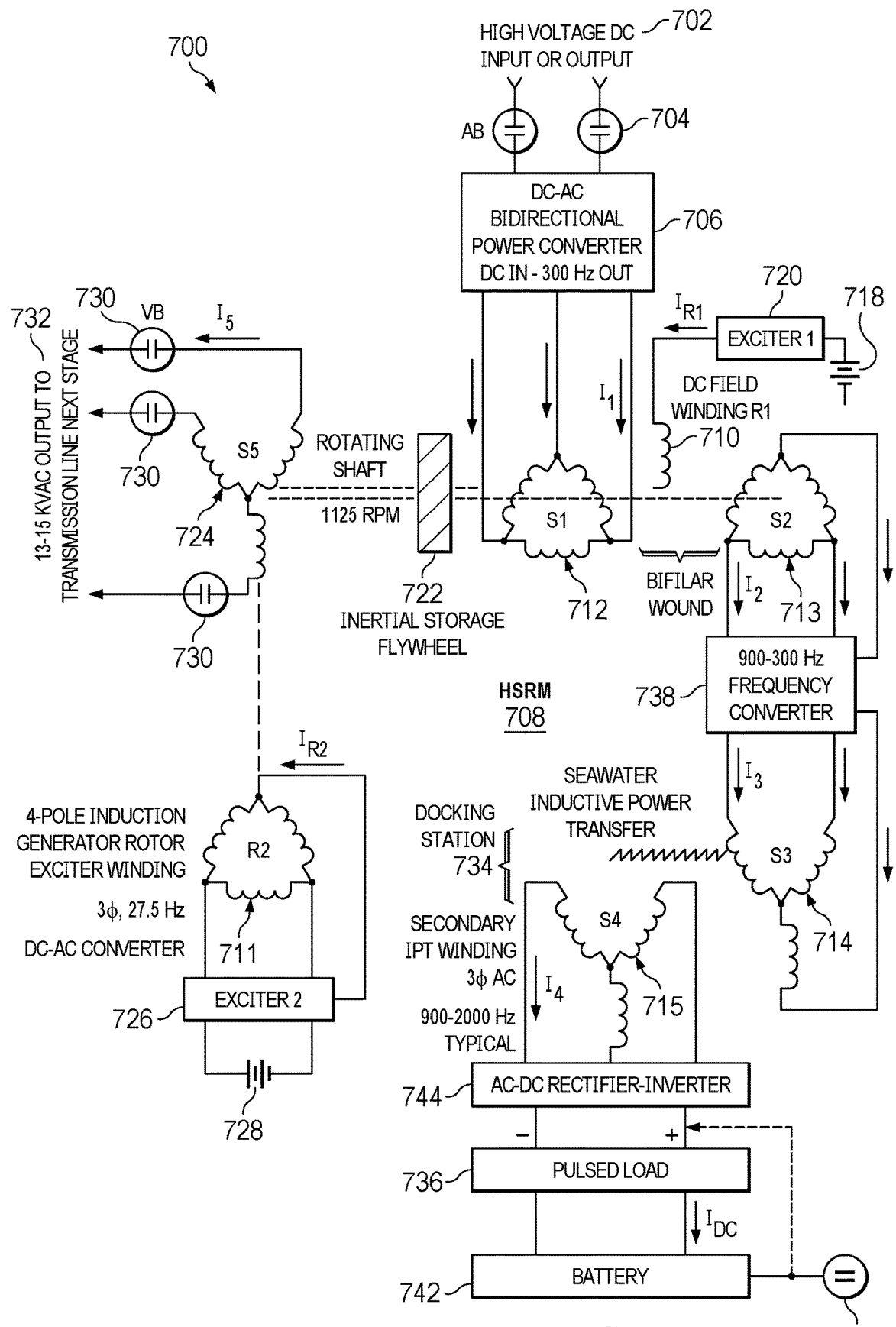
FIG. 7 illustrates yet another example node for use in a high-voltage power modulation and energy distribution system according to this disclosure.

FIG. 7 illustrates yet another example node 700 for use in a high-voltage power modulation and energy distribution system according to this disclosure. In some embodiments, the node 700 can represent (or be represented by) one of the nodes 110a-110c of FIG. 1 or one of the nodes 310a-310c of FIG. 3. However, the node 700 could be used with any other suitable device or system.

As shown in FIG. 7, the node 700 includes a power input 702, input vacuum breakers 704, a power converter 706, an HSRM 708, rotors 710 and 711, synchronous machine stators 712 and 713, IPT stators 714 and 715, an excitation power supply 718, an excitation controller 720, an inertial storage flywheel 722, an induction generator 724, an excitation polyphase AC rotor power supply 726, a battery 728, multiple vacuum circuit breakers 730, a downstream transmission line 732, a docking station 734, and an AC-AC power converter 738. These components may be the same as or similar to corresponding components in the node 600 of FIG. 6, and a detailed description will not be repeated here. However, the node 700 features a number of differences compared to the node 600. For example, the incoming transmission line to the node 700 is high-voltage DC rather than AC. Thus, the power input 702 is DC, and the associated power converter 706 is a DC-to-polyphase AC converter to power the synchronous motor stator S1 712.

A pulsed device 736 is electrically coupled to the output of the IPT stator S4. The pulsed device 736 is a DC node, which may be a combination of a mobile DC power source 740 (such as a fuel cell, which is low-voltage DC) and an energy sink (such as a sonar load). In some embodiments, the pulsed device 736 includes a UUV or submarine. A battery 742 coupled to the pulsed device 736 can be a bidirectional load/source depending on the state of charge. The secondary IPT winding of the stator 715 is connected to an AC-to-DC rectifier-inverter 744 to directly feed the pulsed device 736 on the mobile platform, as either a source or sink.

If the battery 742 is depleted due to the pulsed device 736 operating at a high repetition rate, the battery 742 can be recharged by the DC power source 740, the IPT connected to the rest of the node 700, or a combination of these sources. In some embodiments, the battery 742 may be substituted with a super-capacitor. The downstream transmission line 732 is shown as an AC transmission line, although this can also be a DC transmission line. The power converter 706 can be configured to allow universal AC/DC input power.

Both the synchronous and induction electrical machines of the HSRM 708 can be bidirectional in power and energy flow into and out of the stator windings. For example, the synchronous motor primary winding S1 of the stator 712 can also be a synchronous generator that sends electrical polyphase power back to the power input 702 via the power converter 706, deriving this energy from the inertial storage flywheel 722. The stator winding S2 feeding the IPT can also receive power from the pulsed device 736 (while operating as a source) via the IPT and the S3 primary winding of the stator 714. The received power can be used in multiple ways, such as to add energy to the inertial storage flywheel 722 (by increasing shaft speed) or to send this energy back to the power input 702 to be used by an upstream node. The primary excitation for the common rotor winding exciting both the S1 and S2 windings is shown as winding R1, which is fed by the excitation power supply 718 and the excitation controller 720. The S5 stator winding of the induction generator 724 can also be an induction motor, whereby power/energy can be extracted from the downstream node and downstream transmission line 732 at approximately 10 Hz low frequency. In this case, the S5 stator winding may be charging the inertial storage flywheel 722 up in speed and increasing inertial kinetic energy, rather than depleting it.

The battery 728 feeding the excitation polyphase AC rotor power supply 726 and rotor winding R2 of the rotor 711 can be charged from a low voltage tap (and rectifier, not shown) on the output line I1 of the power converter 706, which mainly feeds the stator 712. Similarly, the power to feed the excitation controller 720 can also be derived from a low-voltage tap and rectifier on the converter output line I1.

Although FIG. 7 illustrates another example of a node 700 for use in a high-voltage power modulation and energy distribution system, various changes may be made to FIG. 7. For example, the node 700 may be coupled to any suitable number of upstream and downstream nodes and transmission lines. Also, various components in the node 700 may be combined, further subdivided, replicated, rearranged, or omitted and additional components may be added according to particular needs. In addition, while FIG. 7 illustrates one example node for use in high-voltage power modulation and energy distribution, this functionality may be used in any other suitable system.

Figure 8:
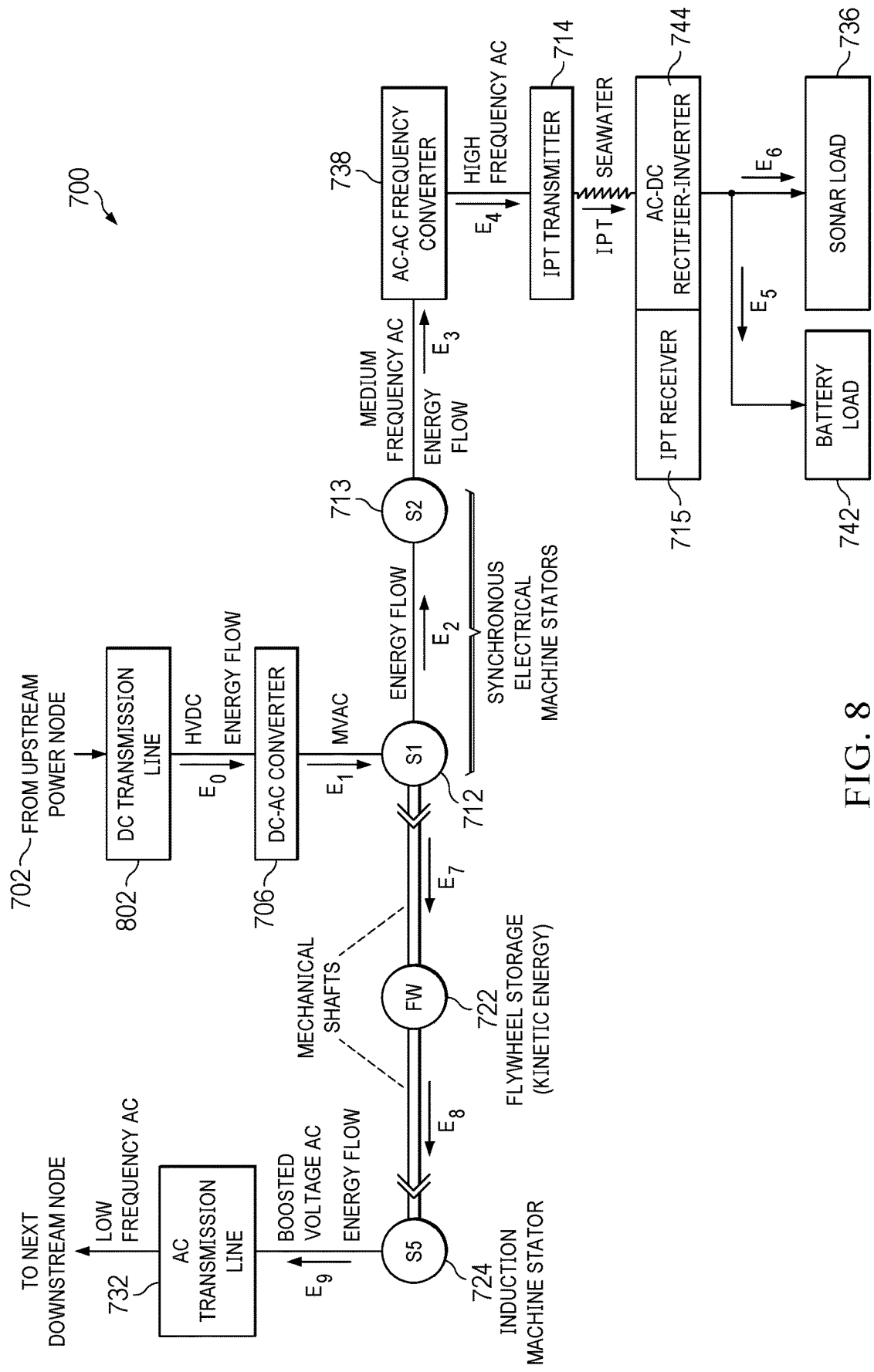
FIGS. 8 and 9 illustrate example energy flow diagrams at a node according to this disclosure.
Figure 9:
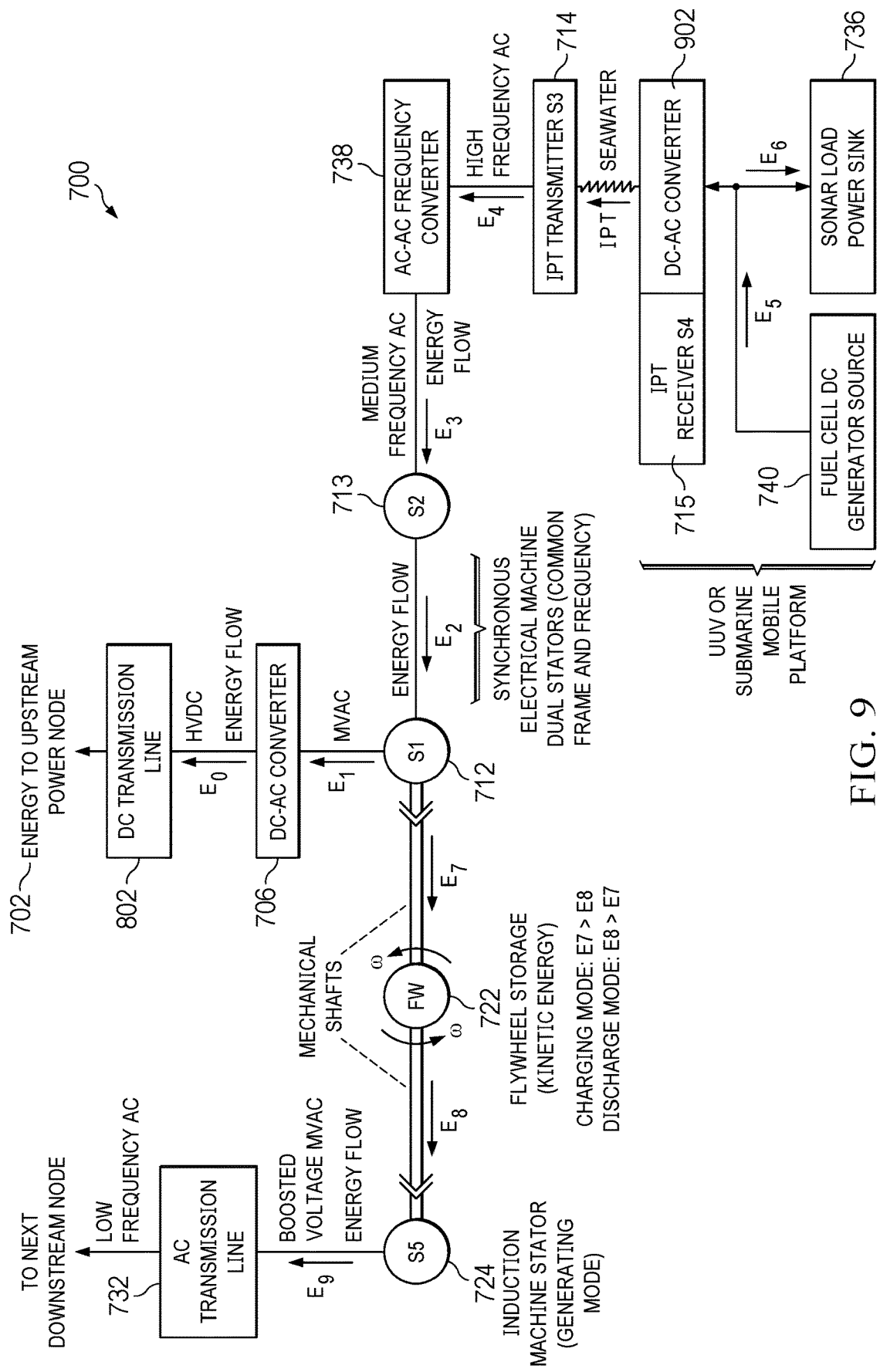

FIGS. 8 and 9 illustrate example energy flow diagrams at the node 700 according to this disclosure. In particular, FIG. 8 illustrates an example of forward energy flow, and FIG. 9 illustrates an example of reverse energy flow. In the example shown in FIG. 8, there are two passive loads coupled to the node 700. It is assumed that all power input 702 ("E0") is from the primary power source (such as the power source 102) and is first sent via a high-voltage DC transmission line 802 to the DC-to-AC power converter 706, where output E1 is fed into the synchronous machine stator polyphase winding S1 712 at a medium frequency (such as approximately 300 Hz). This acts as a motoring winding to increase the speed of the shaft connected to the inertial storage flywheel 722, thus imparting energy E7 to the shaft.

Simultaneously, the stator S1 712 is magnetically coupled to the stator S2 713, which produces energy E3, also at a medium frequency (such as approximately 300 Hz). The energy E3 is up-converted in frequency in the AC-AC power converter 738 to a higher frequency (such as approximately 900 to 2000 Hz) and termed energy E4. This polyphase power corresponding to E4 is fed into a polyphase IPT "transmitter" unit at the stator 714, which creates the magnetic field across a seawater gap into a matching IPT "receiver" at the stator 715, which is also a polyphase winding and magnetic assembly. The seawater gap for transferring power may be on the order of approximately 1 to 5 inches (2.5 to 12.7 cm), which avoids having a contact type transfer in seawater that is subject to corrosion.

The IPT receiver 715 is connected to the AC-to-DC rectifier-inverter 744 on the mobile platform or UUV and outputs DC power to two example loads, which are also on the mobile platform: (i) the pulsed load 736, which can be a sonar transmitter/receiver, taking energy E6, and (ii) the battery 742, taking energy E5 for recharging the electrolyte. Either one of these loads may be stochastic or transient in nature.

The inertial storage flywheel 722 can be charged up to full kinetic potential (if necessary) by input mechanical energy E7. When required by the downstream load, the kinetic energy can be extracted and converted to electrical power as energy E8 by action of the S5 stator winding of the induction generator 724. The speed of the inertial storage flywheel 722 changes from a high speed (such as approximately 1125 RPM) to a lower speed (such as approximately 500 RPM) when energy is being extracted by a downstream node. The stator S5 has a main polyphase output port and produces energy E9 in the form of low-frequency AC power (such as polyphase AC), which can be transformed up in voltage by a transformer (not shown in FIG. 8) or sent directly to the downstream transmission line 732 for delivery of energy E9 to the next node.

The S5 stator winding of the induction generator 724 may be wound for a high-voltage output (such as approximately 15 KV RMS) if the machine set is large enough in KVA capacity (such as over approximately 250 KVA). If the S5 stator winding is of minor output capacity (such as under approximately 250 KVA) and reduced diameter, the machine output potential may be limited (such as to about 1.2 KV RMS) and may interface to a step-up transformer. The induction generator 724 has a wound-field polyphase rotor for excitation as described in greater detail below. By powering the excitation circuit of the induction generator 724 in a negative-sequence mode, the stator output frequency can be a subtraction of excitation frequency (such as approximately 27.5 Hz) from the rotor electromagnetic frequency of approximately 37.5 Hz (corresponding to an approximately 1125 RPM shaft speed) to yield approximately 10 Hz on the S5 stator port for subsequent transmission. As the rotor speed drops with energy extraction, the rotor excitation frequency is correspondingly lowered by its controller to yield a desired low frequency stator output. Once the inertial storage flywheel 722 reaches a lower speed limit (such as approximately 500 RPM or approximately 40% of top speed), the inertial storage flywheel 722 can be recharged by the shore power being received in the node 700, first through energy E0 and then to electrical energy E1 and to E7 for mechanical shaft power.

In the example shown in FIG. 9, a reverse power flow is illustrated, with a fuel cell on the mobile platform yielding power. As shown in FIG. 9, the mobile DC power source 740 (such as an electro-chemical fuel cell or an electro-chemical battery with a high level of charge state in a UUV or submarine) is generating power/energy E5 and transmitting the energy with a possible pulsed shunt load 736 (such as a mobile sonar load) reducing it by energy E6. After conversion (such as to approximately 900 Hz) in a DC-to-AC converter 902, the E5 less E6 energy goes through the seawater IPT (the S4 and S3 magnetic winding assemblies of the stators 715 and 714, respectively) as energy E4 to the AC-AC power converter 738 and then at a lower frequency (such as approximately 300 Hz) as energy E3 into the synchronous stator 713, which powers the inertial storage flywheel 722 up to a shaft speed @. Stored kinetic energy in the inertial storage flywheel 722 is determined by the equation $E=\frac{1}{2} J \varphi^2$, where J is the moment of inertia of the inertial storage flywheel 722. The stored kinetic energy is variable depending on the state of charge of the node 700.

The electrical energy E2 is output from the stator 713 through a common magnetic circuit with the stator 712, whose output energy E1 can also feed the DC-to-AC power converter 706, thereby producing output high-voltage DC power at energy E0 into the high-voltage DC transmission line 802 to an upstream node. This assumes there is a need for energy at the upstream node; otherwise E1 and E0 may be zero, and all of the E2 energy can go directly into boosting up the kinetic energy of the inertial storage flywheel 722. Thus, the energy E5 generated in the mobile platform has two final paths for boosting system energy.

The energy E7 of the synchronous machine mechanical output for charging the inertial storage flywheel 722 also allows the same shaft energy E8 (slightly less than E7) to power the induction generator 724 as a polyphase generator. There may be instances when the energy E5 generated in the mobile platform is zero, so all of the E8 energy output to the transmission line 732 or the next node can be derived from the stored energy in the inertial storage flywheel 722. The energy E9 output by the induction generator 724 is controlled in magnitude and voltage by a rotor excitation circuit (not specifically shown in FIG. 9). The energy E9 at low frequency is fed (after a vacuum circuit breaker and optional step-up transformer) to the transmission line 732 at a medium voltage AC (MVAC) (such as approximately 10-15 KV RMS) to the downstream node. Thus, excess energy from one mobile UUV can assist another UUV further downstream that is in need of an energy boost to its battery.

In some implementations, each UUV has communications/sonar equipment and a propulsion motor on-board that use the energy stored in the UUV's battery supply. In some embodiments, each UUV can return to an IPT or contact-type electrical docking station on a regular or stochastic basis to recharge its battery or super-capacitor energy storage.

Although FIGS. 8 and 9 illustrate examples of energy flow diagrams at the node 700, various changes may be made to FIGS. 8 and 9. For example, while FIG. 8 shows a DC input to AC output node 700, other embodiments can accommodate either AC or DC input power and energy (such by using the circuits shown in FIGS. 11A and 11B described below) for the DC link-inverter stage combination that feeds the stator 712. Also, various components in the node 700 may be combined, further subdivided, replicated, rearranged, or omitted and additional components may be added according to particular needs. In addition, while FIGS. 8 and 9 illustrate example energy flow diagrams for a node in a high-voltage power modulation and energy distribution, this functionality may be used in any other suitable system.

Figure 10:
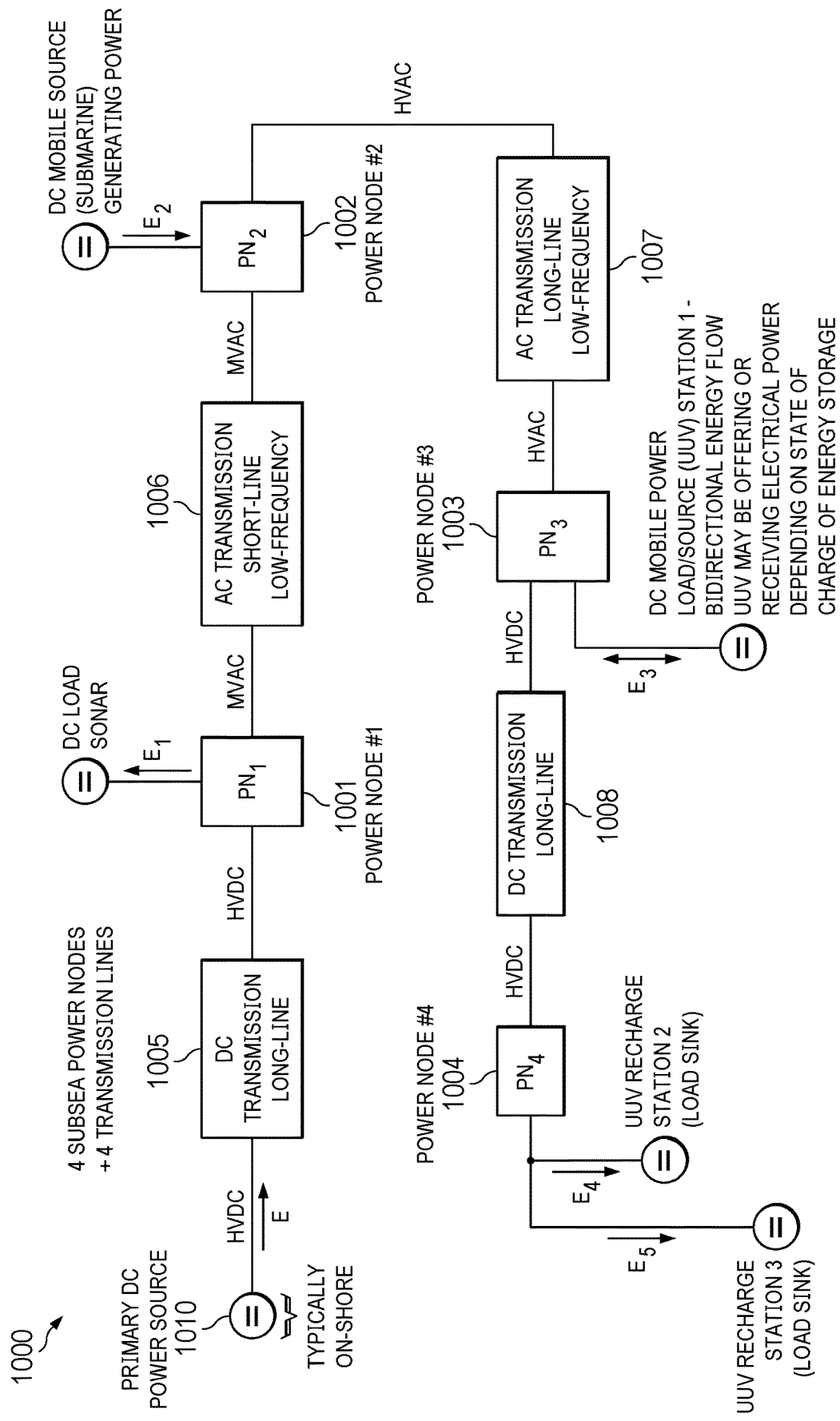
FIG. 10 illustrates an example energy flow diagram for a power modulation and energy distribution system that includes combined medium-voltage alternating current (AC), high-voltage AC, and high-voltage direct current (DC) transmission according to this disclosure.

FIG. 10 illustrates an example energy flow diagram for a power modulation and energy distribution system 1000 that includes combined MVAC, HVAC, and HVDC transmission according to this disclosure. As discussed earlier, MVAC (such as approximately 10-15 KV RMS) can be used for short transmission lines (such as less than approximately 10 km in length), HVAC (such as approximately 15-30 KV RMS) can be used for medium-length transmission lines (such as approximately 15 km in length), and HVDC (such as approximately 20-50 kVDC) can be used for long distance subsea transmission (such as greater than approximately 25 km in length).

As shown in FIG. 10, the system 1000 includes multiple power nodes 1001-1004 connected in series to a primary power source 1010 via multiple transmission lines 1005-1008. Each power node 1001-1004 can represent one of the power nodes described in earlier figures, such as the nodes 110a-110c, 310a-310c, 600, or 700. Each power node 1001-1004 is able to receive and "transmit" bidirectional electric power by its DC-AC or AC-AC power converters, which also serve as variable-speed frequency changers for powering the electrical machinery up and down in shaft speed. Each power node 1001-1004 also has inertial energy storage and at least three power ports. One or more of the power node 1001-1004 may have multiple local stochastic loads and two or more output local ports, such as shown at the power node 1004.

In some embodiments, the power nodes 1001-1004 are "repeatable" or "stackable," meaning the power nodes 1001-1004 have similar or identical basic designs and their input/output voltages are matched. Such repeatability allows for multiple mobile subsea power sources, with each power node 1001-1004 having the ability to boost voltage from input to output to compensate for long transmission line voltage drops between adjacent nodes. The system 1000 allows at least some of the power nodes 1001-1004 to be cut off from the primary power source 1010 (such as due to a severed transmission line 1005-1008), and the cut off power nodes 1001-1004 can remain semi-functional (such as maintain operations) if at least one subsea node has a power/energy injection, such as from a submarine or UUV. An example of this is shown as occurring at the power node 1003.

Although FIG. 10 illustrates one example of a high-voltage power modulation and energy distribution system 1000, various changes may be made to FIG. 10. For example, the system 1000 may include any number of power nodes 1001-1004 and transmission lines 1005-1008. Also, various components in the system 1000 may be combined, further subdivided, replicated, rearranged, or omitted and additional components may be added according to particular needs. In addition, while FIG. 10 illustrates one example system for high-voltage power modulation and energy distribution, this functionality may be used in any other suitable system.

Figure 11A:
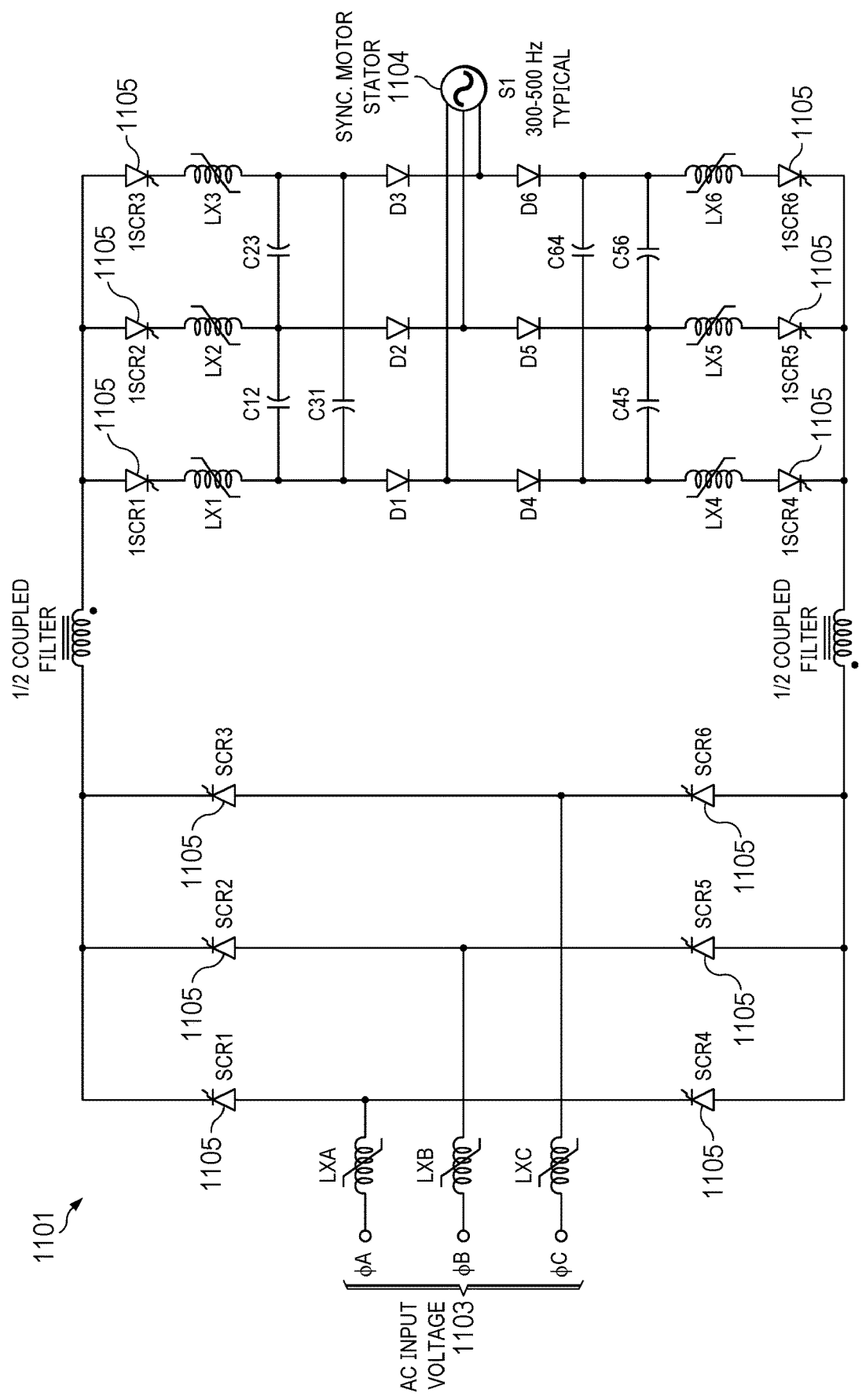
FIGS. 11A and 11B illustrate examples of power converters for use in a node of a high-voltage power modulation and energy distribution system according to this disclosure.
Figure 11B:
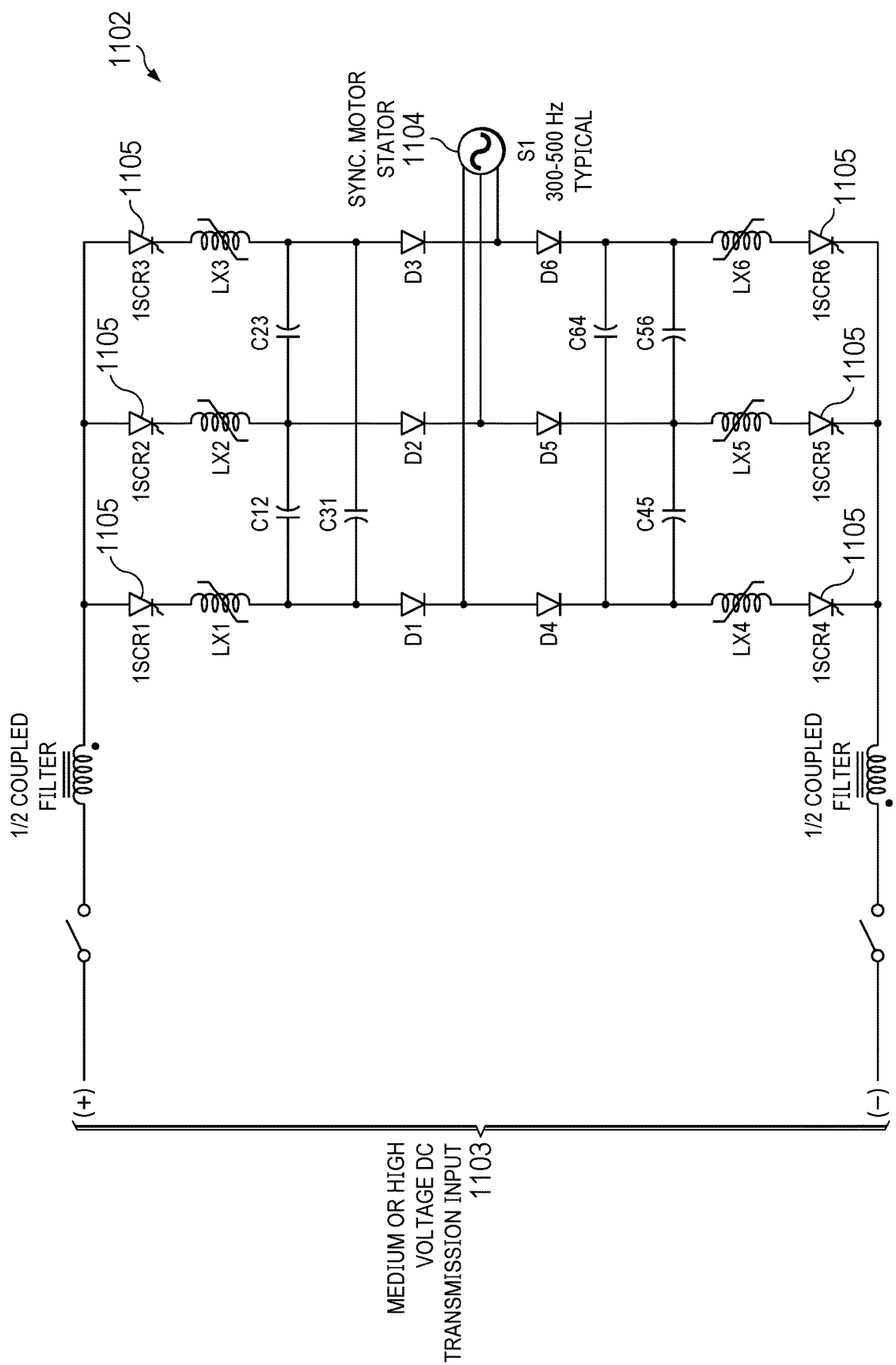

FIGS. 11A and 11B illustrate examples of power converters for use in a node of a high-voltage power modulation and energy distribution system according to this disclosure. In particular, FIG. 11A illustrates an example AC-to-AC power converter 1101 (which can represent one of the AC-to-AC power converters 122b, 122c, 204, 322b, 322c, 606), and FIG. 11B illustrates an example DC-to-AC power converter 1102 (which can represent one of the DC-to-AC power converters 122a, 322a, 706).

As shown in FIGS. 11A and 11B, each power converter 1101 and 1102 has an input power 1103 and an output power 1104. In the AC-to-AC power converter 1101, the input power 1103 is low frequency (such as approximately 5-10 Hz) AC power at approximately 10-15 KV AC. In the DC-to-AC power converter 1102, the input power 1103 is medium or high-voltage DC power. Each power converter 1101 and 1102 also includes multiple thyristors 1105. Each thyristor 1105 represents multiple (such as four or more) devices connected in series to attain a high blocking voltage. The output power 1104 in both power converters 1101 and 1102 is AC power in a frequency range of approximately 300-500 Hz. The output power 1104 is provided to the electrical machine input stator winding (such as the stator 612 or 712).

Although FIGS. 11A and 11B illustrate examples of power converters 1101 and 1102 for use in a node of a high-voltage power modulation and energy distribution system, various changes may be made to FIGS. 11A and 11B. For example, various components in the power converters 1101 and 1102 may be combined, further subdivided, replicated, rearranged, or omitted and additional components may be added according to particular needs. Also, while FIGS. 11A and 11B illustrate examples of power converters for use in a node of a high-voltage power modulation and energy distribution system, this functionality may be used in any other suitable system.

Figure 12:
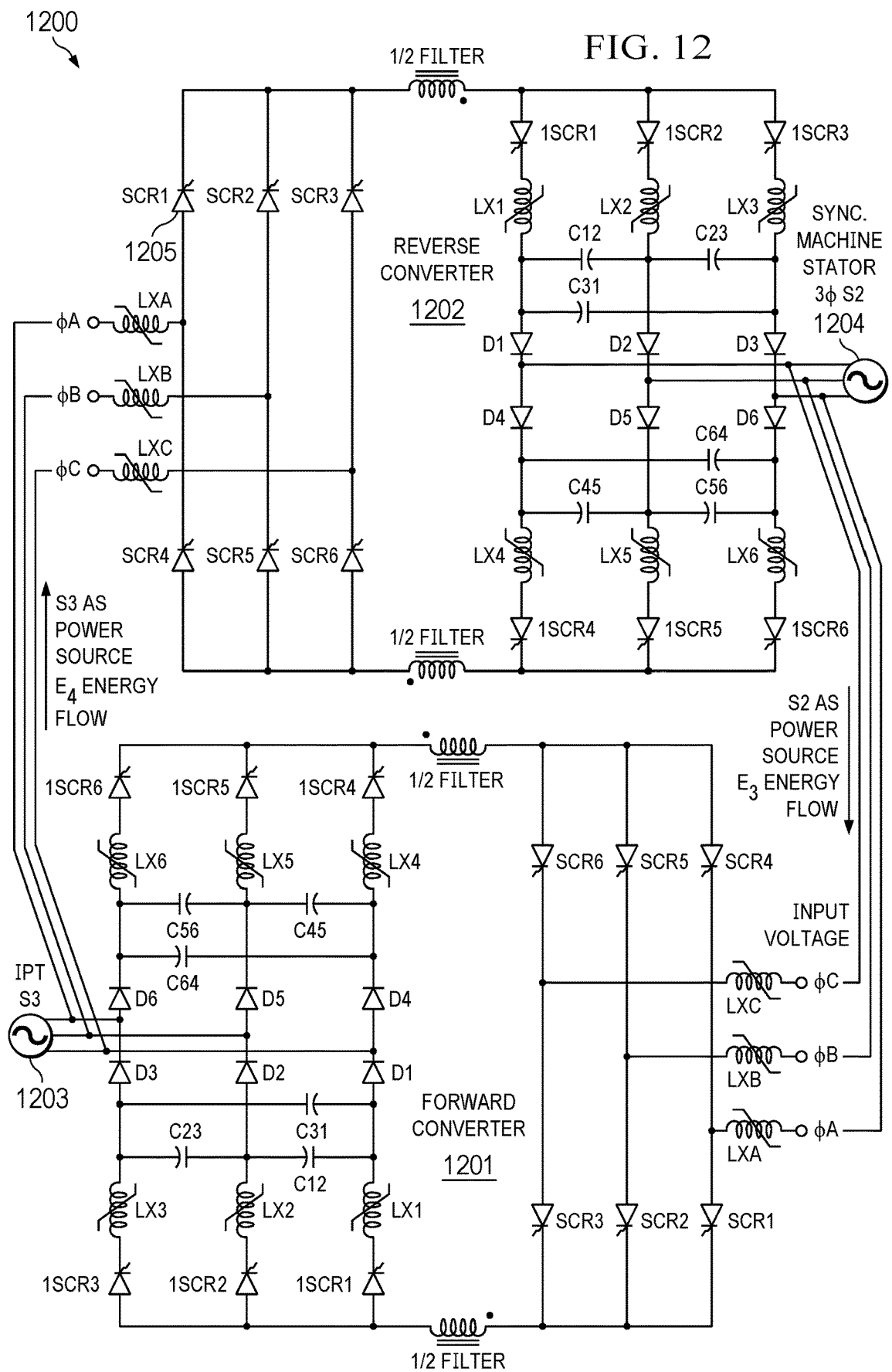
FIG. 12 illustrates an example bidirectional AC-to-AC power converter for use in a node of a high-voltage power modulation and energy distribution system according to this disclosure.

FIG. 12 illustrates an example bidirectional AC-to-AC power converter 1200 for use in a node of a high-voltage power modulation and energy distribution system according to this disclosure. In some embodiments, the bidirectional AC-to-AC power converter 1200 can represent the power converter 638 or the AC-AC power converter 738. These provide controllable voltage and controllable frequency output. As shown in FIG. 12, the power converter 1200 includes a forward converter 1201 and reverse converter 1202 that operate between two nodes 1203 and 1204 and allow forward or reverse power flow. The forward converter 1201 and the reverse converter 1202 can each have the same or similar circuitry as the AC-to-AC power converter 1101 of FIG. 11A, including multiple thyristors 1205. Other power semiconductors such as IGBTs or IGCTs may be substituted for the thyristors 1205.

The node 1203 (which can be an input or an output, depending on the direction of operation of the power converter 1200) can be an IPT polyphase primary stator winding of the S3 stator (such as the stator 614 or 714). The node 1204 (which can be an input or an output depending on the direction of operation of the power converter 1200) can be a polyphase synchronous machine stator winding of the S2 stator (such as the stator 613 or 713).

Although FIG. 12 illustrates an example bidirectional AC-to-AC power converter 1200 for use in a node of a high-voltage power modulation and energy distribution system, various changes may be made to FIG. 12. For example, various components in the power converter 1200 may be combined, further subdivided, replicated, rearranged, or omitted and additional components may be added according to particular needs. Also, while FIG. 12 illustrates a bidirectional AC-to-AC power converter for use in a node of a high-voltage power modulation and energy distribution system, this functionality may be used in any other suitable system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example. "at least one of: A, B, and C" includes any of the following combinations: A, B, C, A and B. A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   multiple electrical nodes connected in series to a primary power source via multiple transmission lines, each node comprising:
   a power converter configured to receive, via a corresponding one of the transmission lines, first power from the primary power source or another one of the multiple nodes upstream of the node, the power converter configured to change at least one of a voltage level of the first power and a frequency of the first power; and
   a high-speed synchronous rotating machine (HSRM), the HSRM comprising an inertial storage flywheel, a rotating excitation assembly, multiple stator windings, and a synchronous motor coupled to an induction generator, the HSRM configured to boost a voltage level between an input and an output to compensate for a voltage drop of the first power over a length of the corresponding transmission line;
   wherein at least one of the nodes further comprises an inductive power coupler configured to electrically couple the node to a mobile power source that is configured to (i) provide second power to the node and (ii) receive a portion of the first power from the node using contactless inductive power transfer.

2. The system of claim 1, wherein the mobile power source comprises a subsea vehicle.

3. The system of claim 1, wherein the at least one of the nodes is further configured to transmit the second power provided by the mobile power source to at least one upstream or downstream node.

4. The system of claim 1, wherein at least one of the nodes further comprises an inertial energy storage flywheel coupled to the synchronous motor of the HSRM, the inertial energy storage flywheel configured to (i) increase in speed and kinetic energy due to the second power provided by the mobile power source and (ii) decrease in speed and kinetic energy when the mobile power source receives the portion of the first power.

5. The system of claim 1, wherein, when the induction generator outputs power, the HSRM is configured to receive rotor excitation power that increases in frequency as a speed of a shaft coupled to the induction generator drops to yield a constant output frequency at one of the stators.

6. The system of claim 1, wherein the transmission lines comprise at least one direct current (DC) transmission line and at least one alternating current (AC) transmission line.

7. The system of claim 6, wherein the at least one AC transmission line is configured to transmit AC power at a frequency of approximately 10 Hz or less.

8. The system of claim 1, wherein at least one of the transmission lines is at least 10 kilometers in length and is configured to transmit power at a voltage level of approximately 10 kV or higher.

9. The system of claim 1, wherein, when at least some of the nodes are cut off from the primary power source, the cut off nodes are configured to maintain operations by receiving power from the mobile power source electrically coupled to the at least one of the nodes.

10. The system of claim 1, wherein each node further comprises a tap point configured to electrically couple the node to a load that receives at least a portion of the first power.

11. The system of claim 10, wherein the load comprises at least one of: communications equipment, a sonar station, a submarine, and an unmanned underwater vehicle (UUV).

12. A node comprising:
a power converter configured to receive first power from a primary power source or an upstream node via a transmission line, the power converter configured to change at least one of a voltage level of the first power and a frequency of the first power;
a high-speed synchronous rotating machine (HSRM), the HSRM comprising an inertial storage flywheel, a rotating excitation assembly, multiple stator windings, and a synchronous motor coupled to an induction generator, the HSRM configured to boost a voltage level between an input and an output to compensate for a voltage drop of the first power over a length of the transmission line; and
an inductive power coupler configured to electrically couple the node to a mobile power source that is configured to (i) provide second power to the node and (ii) receive a portion of the first power from the node using contactless inductive power transfer.

13. The node of claim 12, wherein the mobile power source comprises a subsea vehicle.

14. The node of claim 12, wherein the node is further configured to transmit the second power provided by the mobile power source to at least one of the upstream node and a downstream node.

15. The node of claim 12, further comprising:
an inertial energy storage flywheel coupled to the synchronous motor of the HSRM, the inertial energy storage flywheel configured to (i) increase in speed and kinetic energy due to the second power provided by the mobile power source and (ii) decrease in speed and kinetic energy when the mobile power source receives the portion of the first power.

16. The node of claim 12, wherein, when the induction generator outputs power, the HSRM is configured to receive rotor excitation power that increases in frequency as a speed of a shaft coupled to the induction generator drops to yield a constant output frequency at one of the stators.

17. The node of claim 12, further comprising:
a tap point configured to couple the node to a load that receives at least a portion of the first power.

18. The node of claim 17, wherein the load comprises at least one of: communications equipment, a sonar station, a submarine, and an unmanned underwater vehicle (UUV).

19. A system comprising:
a land-based primary power source;
a first node connected to the primary power source via a first transmission line;
a second node connected to the first node via a second transmission line; and
a third node connected to the second node via a third transmission line;
wherein each of the first, second, and third nodes comprises:
a power converter configured to receive, via a corresponding one of the transmission lines, first power from the primary power source or another one of the nodes, the power converter configured to change at least one of a voltage level of the first power and a frequency of the first power; and
a high-speed synchronous rotating machine (HSRM), the HSRM comprising an inertial storage flywheel, a rotating excitation assembly, multiple stator windings, and a synchronous motor coupled to an induction generator, the HSRM configured to boost a voltage level between an input and an output to compensate for a voltage drop of the first power over a length of the corresponding transmission line;
wherein at least one of the first, second, and third nodes further comprises an inductive power coupler configured to electrically couple the node to a mobile power source that is configured to (i) provide second power to the node and (ii) receive a portion of the first power from the node using contactless inductive power transfer; and
wherein the first transmission line comprises a direct current (DC) transmission line and at least one of the second and third transmission lines comprises an alternating current (AC) transmission line.

20. The system of claim 19, wherein the mobile power source comprises a subsea vehicle.

21. The system of claim 19, wherein the power converter is configured to provide bidirectional energy and power flow.

* * * * *